(12) United States Patent
Kemmerer et al.

(10) Patent No.: US 11,147,213 B2
(45) Date of Patent: Oct. 19, 2021

(54) THRESHING SECTION OF A COMBINE

(71) Applicant: CNH INDUSTRIAL AMERICA LLC, New Holland, PA (US)

(72) Inventors: Benjamin Kemmerer, New Holland, PA (US); Joshua Lesher, Bernville, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 386 days.

(21) Appl. No.: 16/238,996

(22) Filed: Jan. 3, 2019

(65) Prior Publication Data
US 2020/0214215 A1 Jul. 9, 2020

(51) Int. Cl.
*A01F 12/10* (2006.01)
*A01F 7/06* (2006.01)

(52) U.S. Cl.
CPC .............. *A01F 12/10* (2013.01); *A01F 7/06* (2013.01)

(58) Field of Classification Search
CPC .. A01F 12/10; A01F 7/06; A01F 7/065; A01F 7/067; A01F 7/04; A01F 12/18; A01F 12/20; A01F 12/24; A01F 7/62
See application file for complete search history.

(56) References Cited

U.S. PATENT DOCUMENTS

| | | | | |
|---|---|---|---|---|
| 4,164,947 A * | 8/1979 | Wilson | .............. | A01F 7/06 460/69 |
| 4,177,821 A * | 12/1979 | Peiler | .............. | A01F 7/06 460/70 |
| 4,269,200 A | 5/1981 | Gorsler | | |
| 4,489,733 A * | 12/1984 | Underwood | .............. | A01F 7/06 209/416 |
| 4,535,787 A * | 8/1985 | Underwood | .............. | A01F 7/06 460/101 |
| 4,900,290 A * | 2/1990 | Tanis | .............. | A01F 12/10 209/263 |
| 4,919,641 A * | 4/1990 | Yarmashev | .............. | A01F 7/06 460/69 |
| 4,986,794 A | 1/1991 | Ricketts | | |
| 5,145,461 A * | 9/1992 | Tanis | .............. | A01F 12/10 460/119 |
| 5,145,462 A * | 9/1992 | Tanis | .............. | A01F 12/10 460/68 |

(Continued)

FOREIGN PATENT DOCUMENTS

DE 202016106044 U1 12/2014
RU 2633398 C1 10/2017

*Primary Examiner* — Thomas B Will
*Assistant Examiner* — Joan D Misa
(74) *Attorney, Agent, or Firm* — Peter Zacharias; Patrick Sheldrake

(57) ABSTRACT

A threshing section for a combine harvester includes a rotor and a transition cone. The rotor has an axis of rotation, a downstream end, and an upstream end. The upstream end includes one or more blades for moving crop downstream in a direction of crop flow. The transition cone at least partially surrounds the upstream end of the rotor and the blades. An annular space is formed between a swept profile of the blades and an interior surface of the transition cone through which crop is introduced into the threshing section. A cross-sectional area of the annular space, which is measured in a radial direction, is substantially constant along at least a portion of a length of the swept profile.

13 Claims, 3 Drawing Sheets

(56) References Cited

U.S. PATENT DOCUMENTS

| | | | |
|---|---|---|---|
| 5,257,959 A * | 11/1993 | Tanis | A01F 12/10 460/67 |
| 5,387,153 A | 2/1995 | Tanis | |
| 5,562,540 A * | 10/1996 | Balmer | A01F 7/06 460/65 |
| 6,050,894 A | 4/2000 | Johnson | |
| 6,083,102 A | 7/2000 | Pfeiffer et al. | |
| 6,296,566 B1 | 10/2001 | Tanis et al. | |
| 6,368,209 B2 * | 4/2002 | Moster | A01F 12/10 460/105 |
| 6,544,118 B2 * | 4/2003 | Schwersmann | A01F 12/10 460/80 |
| 6,688,970 B2 | 2/2004 | Tanis | |
| 6,830,512 B2 * | 12/2004 | Tanis | A01F 7/06 460/46 |
| 6,908,378 B2 | 6/2005 | Ricketts et al. | |
| 8,079,899 B2 * | 12/2011 | Schwersmann | A01F 7/06 460/66 |
| 2020/0404849 A1 * | 12/2020 | Flickinger | A01F 7/06 |
| 2021/0045293 A1 * | 2/2021 | O'Donnell | A01F 7/02 |

* cited by examiner

THRESHING SECTION OF A COMBINE

FIELD OF THE INVENTION

The present invention relates to agricultural combine threshing sections.

BACKGROUND OF THE INVENTION

As is described in U.S. Pat. No. 6,688,970, which is incorporated by reference in its entirety, a well-known form of harvesting machine is a rotary combine. A typical combine includes a crop harvesting apparatus which reaps grain stalks and other plant materials and feeds them to a threshing section.

The threshing section includes a rotor and a generally tubular rotor housing mounted in the combine body. The rotor is coaxially and rotatably mounted within the rotor housing. The rotor comprises an infeed or inlet section and a cylindrical threshing zone including rasp bars (for example). The crop material is threshed as it spirals around the threshing zone and passes through openings in the rotor housing.

As discussed in Tanis U.S. Pat. No. 5,387,153, which is also incorporated by reference in its entirety, the ability to transfer crop materials from the feeder assembly to the threshing section of the rotor assembly is a key to efficient combine operations. During harvesting operations, the generally linear movement of the crop materials received from a feeder assembly of the combine is converted by the rotating impeller flights into a rotating, circulatory movement, in a rearward and outward direction.

In operation, pinch points of the crop moving through the threshing section can form in the threshing section, and such pinch points can lead to wear of the threshing system components, a reduction in threshing capacity, power loss and other inefficiencies.

SUMMARY OF THE INVENTION

Described herein is a threshing section for a combine harvester. The threshing section comprises a rotor and a transition cone. The rotor has an axis of rotation, a downstream end and an upstream end. The upstream end includes one or more blades for moving crop downstream in a direction of crop flow. The transition cone at least partially surrounds the upstream end of the rotor and the blades. An annular space is formed between a swept profile of the blades and an interior surface of the transition cone through which crop is introduced into the threshing section. A cross-sectional area of the annular space, which is measured in a radial direction, is substantially constant along at least a portion of a length of the swept profile.

According to another aspect of the invention, a combine harvester comprises a crop feeder assembly, a rotor assembly, and a threshing section. The threshing section comprises a rotor and a transition cone. The rotor has an axis of rotation, a downstream end and an upstream end. The upstream end includes one or more blades for moving crop downstream in a direction of crop flow. The transition cone at least partially surrounds the upstream end of the rotor and the blades. An annular space is formed between a swept profile of the blades and an interior surface of the transition cone through which crop is introduced into the threshing section. A cross-sectional area of the annular space, which is measured in a radial direction, is substantially constant along at least a portion of a length of the swept profile.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
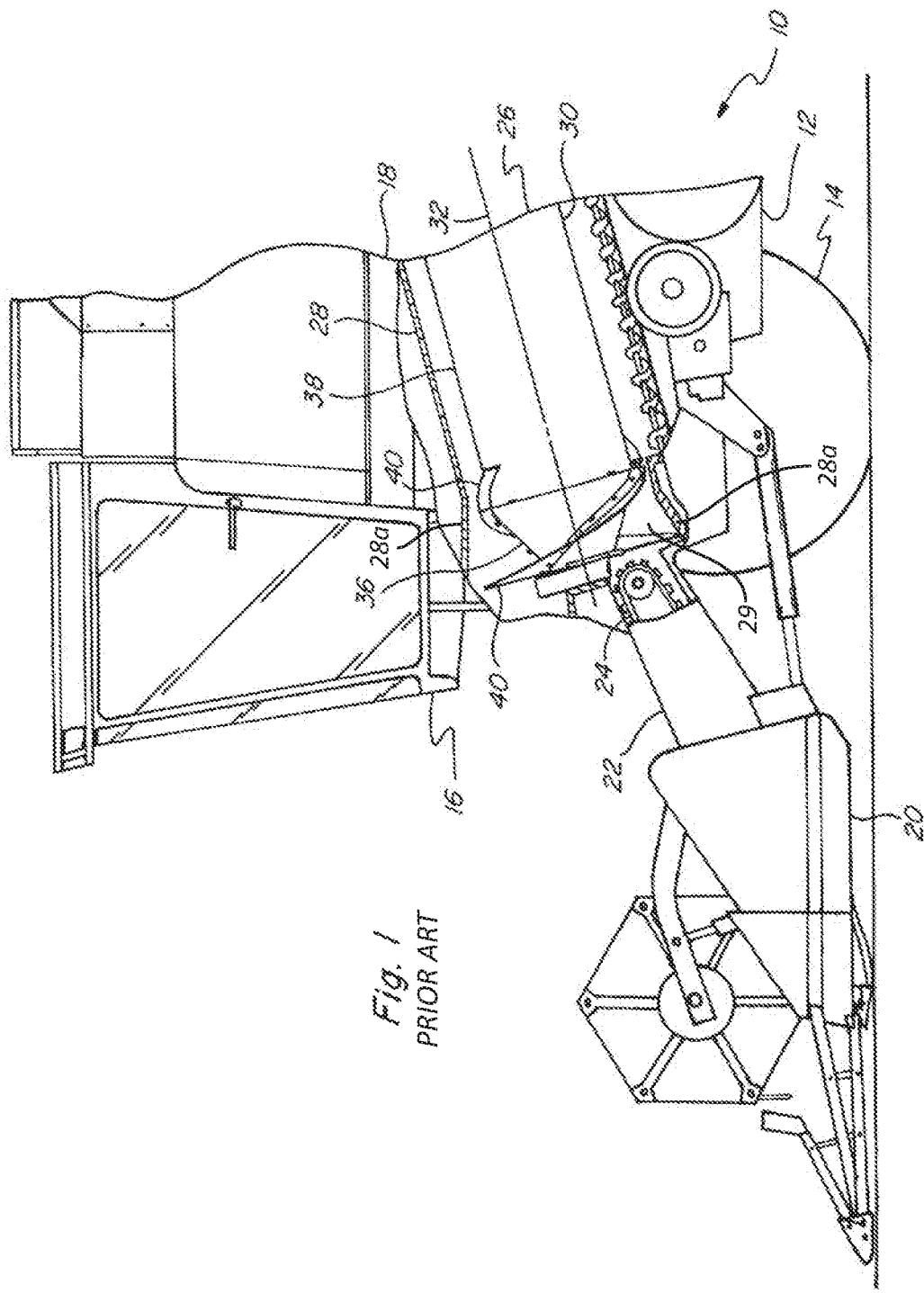
FIG. 1 is a side elevational view of a portion of a rotary combine, according to the prior art, showing in partial section a crop feeder assembly, and a front inlet section of a threshing section.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, as is described in U.S. Pat. No. 6,688,970, in FIG. 1 a self-propelled rotary combine is seen generally at 10. Combine 10 includes a front portion 12 including front wheels 14, an operator cab 16, and an engine (not shown) suitably supported within a body 18. The transfer of power from the engine to various driven components of combine 10 is effected conventionally.

Combine 10 is provided with a crop harvesting header assembly 20 for cutting and gathering crop materials. Header assembly 20 cuts and directs the crop material into a crop feeder assembly 22 including a conveyor 24. Conveyor 24 carries the crop material upwardly toward a rotor assembly 26, which threshes grain from material other than the grain (MOG). Rotor assembly 26 is supported in a conventional manner inside body 18. Rotor assembly 26 includes a cylindrical rotor housing (or cage) 28 mounted in a front to rear orientation in body 18. A rotor 30 is mounted in housing 28 for rotation therein in a predetermined rotational direction about an axis 32 through rotor 30. Axis 32 is oriented at an acute angle to horizontal as shown.

Figure 2:
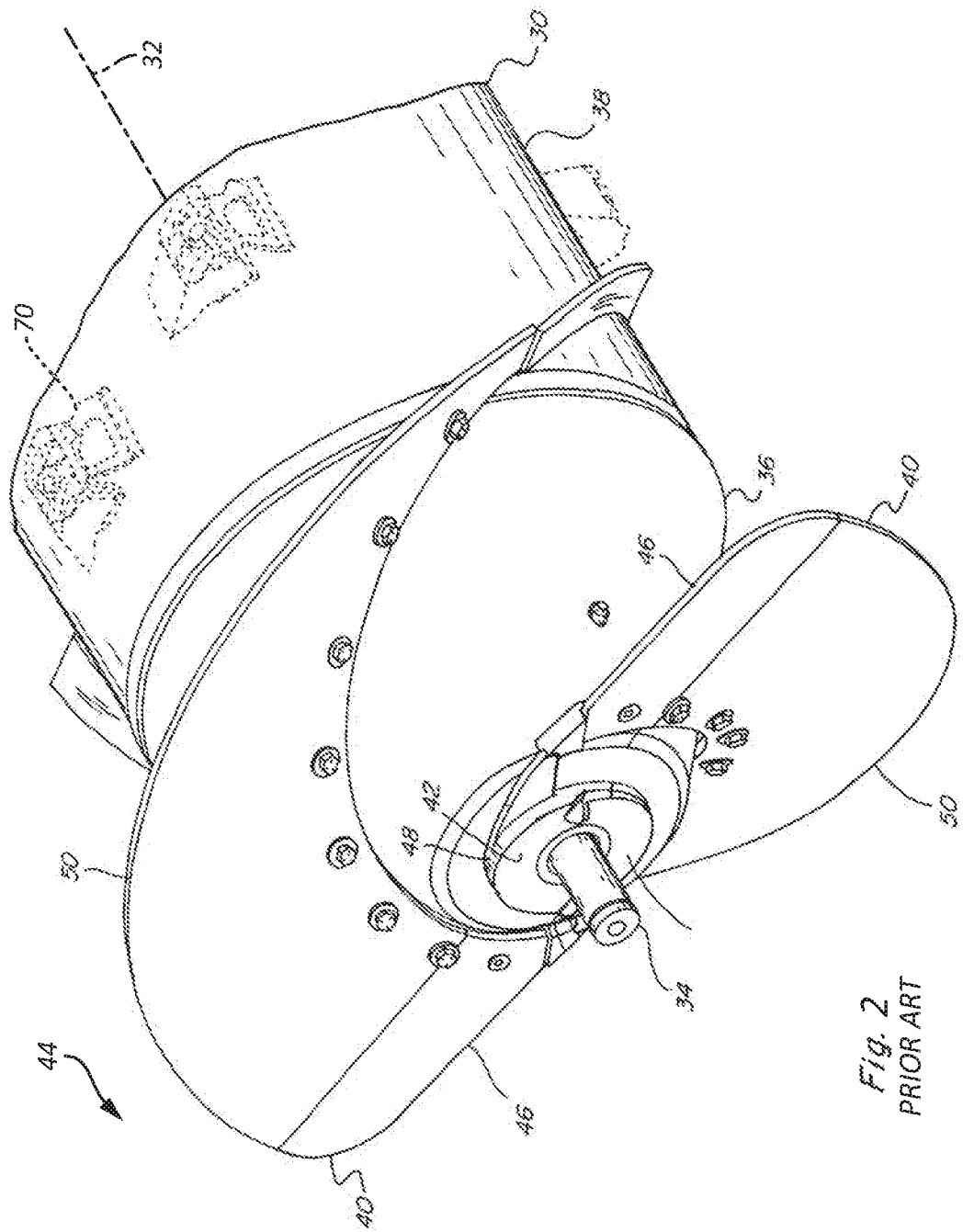
FIG. 2 is fragmentary perspective view of the rotor of FIG. 1 according to the prior art.

Referring now to FIG. 2, rotor 30 is a hollow drum rigidly affixed to a shaft 34 extending coaxially therethrough. Rotor 30 includes a front infeed or inlet section 36, and a rear threshing zone 38. Front inlet section 36 has a conical shape, extending radially outwardly relative to axis 32 rearwardly from adjacent to front center portion 42 to threshing zone 38. Rotor 30 is rotatable in rotor housing 28 in the direction denoted by arrow 44 in FIG. 2.

Front inlet section 36 includes two helical impeller blades 40 (alternately referred to as impeller augers or flights) extending therearound in a rearward direction from a front center portion 42 to threshing section 38. Impeller blades 40 rotate within a transition cone 28a which is a forward part of rotor housing 28. Transition cone 28a may be connected to housing 28. Transition cone 28a may also be referred to herein and in the art as a transition section or a conical shroud.

Each impeller blade 40 includes a helically-shaped flight having a leading edge 46, which extends radially outwardly with respect to axis 32 from a radial outer circumferential edge 48 of front center portion 42, and terminates at a trailing edge 50. According to the prior art embodiment shown in FIG. 2, each impeller auger 40 has a helical pitch that increases in the rearward direction along the length thereof, which enables augers 40 to aggressively move plant material rearwardly from feeder assembly 22 during rotation of rotor 30.

In regular use, there can exist a great amount wear at the downstream end of transition cone 28a. Impeller blades 40 also wear the most at the trailing end 50 over the downstream end of transition cone 28a. These wear patterns are indicative of a pinch point at the downstream end of transition cone 28a. The pinch point causes crop pressure to build and unnecessarily consumes power. More particularly, as the crop moves rearward, the cone diameter decreases and so does the cross sectional area with which the crop can pass through. Since a majority of the crop is transported outside of the swept diameter of the impeller blades 40, the impeller blades 40 progressively build pressure against the crop mat as it moves rearward through the cone 28a.

Figure 3:
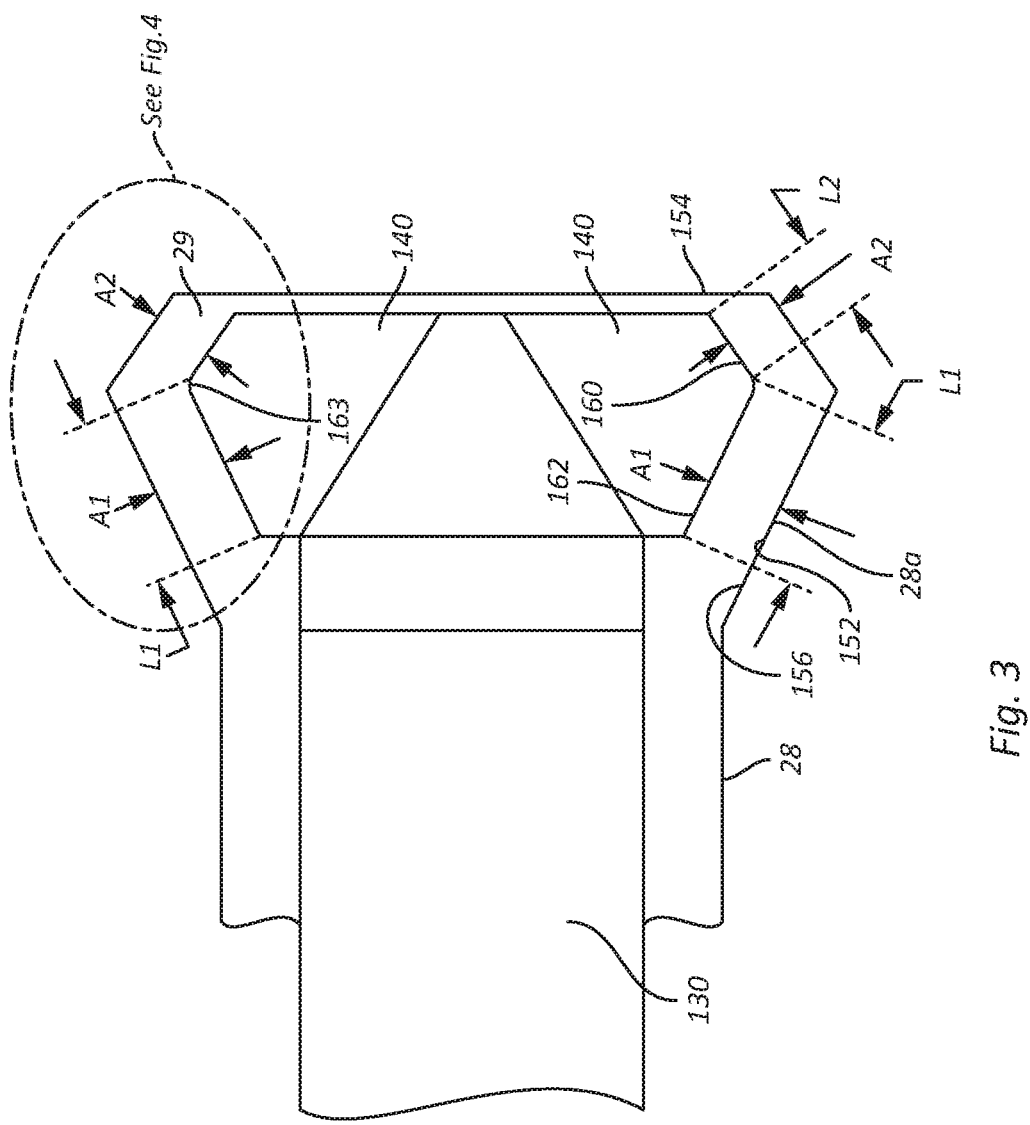
FIG. 3 is a side elevational view of a segment of the threshing section of a rotary combine, showing a swept profile of the rotor.

Turning now to FIG. 3, the geometry of the impeller blades 140 of rotor 130 differs from that of the impeller blades 40 of rotor 30 shown in FIG. 2 to address the above concern relating to the pinch point. Specifically, impeller blades 140 are dimensioned to provide a constant cross sectional area A1 (as measured in a radial direction) in the annular space 29 defined between the portion of the swept profile of the blades 140 and interior surface 152 of transition cone 28a that extends along the length L1. The cross-sectional area A1 of the annular space 29 is defined about a perimeter of rotor 30.

Because the cross-sectional area A1 between the swept profile of the blade 140 and the cone surface 152 is constant, the crop mat pressure toward the front 154 of the cone 28a will be the same as the pressure at the rear 156 of the cone 28a. This will help increase the threshing capacity of the rotor and decrease the severity of wear within the region denoted by dimension L1. A swept profile of rotor 130 is shown in FIG. 3.

Blades 140 have a front leading upstream end 160 that is conical, as viewed as a swept profile. The length of the upstream end 160 is denoted by dimension L2. The diameter of the front upstream end 160 increases in a downstream direction. Blades 140 also have a rear trailing downstream end 162 that is conical, as viewed as a swept profile. The upstream and downstream ends meet at a transition portion 163. The length of the downstream end 162 is denoted by dimension L1. The diameter of the rear downstream end 162 decreases in a downstream direction. The swept diameter at the rear downstream end of blades 140 is decreased in comparison to that of various known blades so that the cross sectional area A1 through which the crop mat passes is substantially constant through the transition cone 28a.

Similarly, cone 28 has a front upstream end that is conical. The diameter of the front upstream end increases in a downstream direction. Cone 28 also has a rear downstream end that is conical. The diameter of the rear downstream end decreases in a downstream direction. The upstream and downstream portions of cone 28 meet at a transition portion.

The cross-sectional area A2 (as measured in a radial direction) defined in the region denoted by dimension L2 between the front upstream end 160 of blades 140 and the interior surface of the front upstream end of cone 28a is also substantially constant along dimension L2 to avoid any pinch points for the crop in that area. The cross-sectional area A1 may be greater than the cross-sectional area A2, or, alternatively, the cross-sectional area A1 may be less than or equal to the cross-sectional area A2.

The changes to the geometry of impeller blades 40 may be paired with changes to patterns in rasp bar 70 (see FIG. 2) or removal of various rasp bars 70 to help reduce crop pressure as the crop transitions in the cylindrical rotor cage 28.

Figure 4:
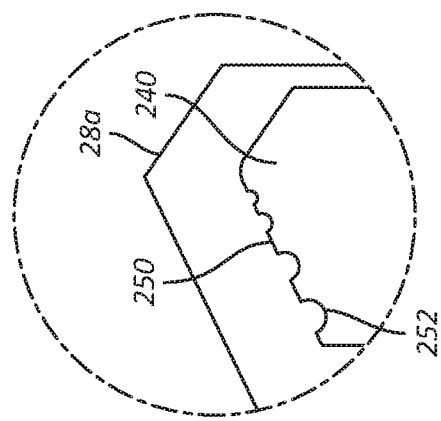
FIG. 4 is a detailed view of FIG. 3 with modifications.

FIG. 4 is a detailed view of FIG. 3 with modifications. The downstream trailing edge of each blade 240 (one shown, and shown as a swept profile) is scalloped on the outer edge 250 to provide relief for crop passing through the region denoted by dimension L1 while maintaining traction of the crop within that region. The scalloped outer edge 250 is especially useful in crops having a low MOG to grain ratio, such as corn. Each individual scallop 252 (also referred to herein as a recess) is a semi-circular recess having a diameter. The diameter of the scallops 252 becomes progressively larger in the downstream direction (i.e., toward the outlet of the cone 28a) where the most relief is needed for crop passing through the region denoted by dimension L1. The scallops 252 are not disposed on the upstream end of the blade 240. The scalloped outer edge 250 is an optional feature of the invention and may be omitted. In the absence of the scallops 252, the edge 250 may be straight as shown in FIG. 3

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing section for a combine harvester, the threshing section comprising:

a rotor having an axis of rotation, a downstream end and an upstream end, the upstream end including one or more blades for moving crop downstream in a direction of crop flow;

a transition cone at least partially surrounding the upstream end of the rotor and the blades; and an annular space formed between a swept profile of the blades and an interior surface of the transition cone through which crop is introduced into the threshing section, wherein a cross-sectional area of the annular space, which is measured in a radial direction, is substantially constant along at least a portion of a length of the swept profile, wherein an upstream portion of the swept profile increases in diameter in the downstream direction, and a downstream portion of the swept profile decreases in diameter in the downstream direction, and the upstream and downstream portions meet at a transition portion, wherein the cross-sectional area of the annular space that extends along an entirety of the downstream portion is constant and has a first predetermined cross-sectional dimension, wherein the cross-sectional area of the annular space that extends along an entirety of the upstream portion is constant and has a second predetermined cross-sectional dimension.

2. The threshing section of claim 1 wherein the cross-sectional area defined between the swept profile of the blades and the interior surface of the transition cone is constant along at least the portion of the swept profile.

3. The threshing section of claim 1, further comprising recesses defined on an edge of each blade of the one or more blades, the recesses being oriented to face the interior surface of the transition cone.

4. The threshing section of claim 3, wherein each recess is semicircular.

5. The threshing section of claim 4, wherein a diameter and depth of the recesses progressively increase in the downstream direction.

6. The threshing section of claim 1, wherein the second predetermined cross-sectional dimension differs from the first predetermined cross-sectional dimension.

7. The threshing section of claim 1, wherein the second predetermined cross-sectional dimension is the same as the first predetermined cross-sectional dimension.

8. The threshing section of claim 1, wherein the transition cone has a semi-conical shape.

9. The threshing section of claim 1, wherein the transition cone is attached to a rotor cage.

10. The threshing section of claim 1, wherein the swept profile of the blades faces the interior surface of the transition cone.

11. The threshing section of claim 1, wherein the cross-sectional area is defined about a perimeter of the rotor.

12. The threshing section of claim 1, wherein the one or more blades extend outwardly from the axis of rotation.

13. A combine harvester comprising:
a crop feeder assembly and the threshing section of claim 1.

* * * * *